United States Patent
Kim et al.

(10) Patent No.: US 9,999,020 B2
(45) Date of Patent: Jun. 12, 2018

(54) DOWNLINK DATA TRANSFER METHOD AND LOCATION UPDATE PROCEDURE EXECUTION METHOD

(71) Applicant: LG Electronics Inc., Seoul (KR)

(72) Inventors: Jaehyun Kim, Seoul (KR); Jinsook Ryu, Seoul (KR); Taehun Kim, Seoul (KR); Hyunsook Kim, Seoul (KR); Laeyoung Kim, Seoul (KR); Taehyeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/107,740

(22) PCT Filed: Jan. 5, 2015

(86) PCT No.: PCT/KR2015/000044
§ 371 (c)(1),
(2) Date: Jun. 23, 2016

(87) PCT Pub. No.: WO2015/105301
PCT Pub. Date: Jul. 16, 2015

(65) Prior Publication Data
US 2016/0323845 A1    Nov. 3, 2016

Related U.S. Application Data

(60) Provisional application No. 61/926,403, filed on Jan. 13, 2014.

(51) Int. Cl.
*H04W 68/02* (2009.01)
*H04W 8/02* (2009.01)
(Continued)

(52) U.S. Cl.
CPC ........... *H04W 68/02* (2013.01); *H04W 4/005* (2013.01); *H04W 8/02* (2013.01); *H04W 8/12* (2013.01);
(Continued)

(58) Field of Classification Search
None
See application file for complete search history.

(56) References Cited

U.S. PATENT DOCUMENTS 9,615,327 B2 *  4/2017  Xie .................. H04W 52/0209
2008/0232292 A1  9/2008  Zhang
(Continued)

FOREIGN PATENT DOCUMENTS

EP    2814289 A1    12/2014
EP    2849506 A1    3/2015
(Continued)

OTHER PUBLICATIONS

3GPP TS 23.401 V12 3.0, "3GPP; TSG-SA; General Packet Radio Service (GPRS) enhancements for Evolved Universal Terrestrial Radio Access Network (E-UTRAN) access (Release 12)", Dec. 17, 2013, see pp. 22-32.

*Primary Examiner* — Xavier Szewai Wong
(74) *Attorney, Agent, or Firm* — Dentons US LLP

(57) ABSTRACT

A disclosure of the present specification provides a method for transferring downlink data by a serving gateway (S-GW). The method may comprise the steps of: transmitting a downlink data notification (DDN) message to a mobility management entity (MME) and a serving general packet radio service (GPRS) supporting node (SGSN), when downlink data arrives at a wireless device in a state where an idle mode signaling reduction (ISR) is activated; receiving a message notifying of a DDN refusal from any one of the MME and SGSN when the wireless device, being in a
(Continued)

power saving mode (PSM), cannot receive the downlink data; and transmitting a paging stop request message to any one of the MME and SGSN when the message indicating the refusal of the DDN is received.

5 Claims, 21 Drawing Sheets

(51) Int. Cl.
    *H04W 88/16*     (2009.01)
    *H04W 8/12*     (2009.01)
    *H04W 4/00*     (2018.01)
    *H04W 52/02*     (2009.01)
    *H04W 60/04*     (2009.01)
    *H04W 88/00*     (2009.01)

(52) U.S. Cl.
    CPC ....... *H04W 52/0229* (2013.01); *H04W 60/04* (2013.01); *H04W 88/16* (2013.01); *H04W 88/005* (2013.01); *Y02B 60/50* (2013.01)

(56) References Cited

U.S. PATENT DOCUMENTS

| | | |
|---|---|---|
| 2010/0069062 A1 | 3/2010 | Horn et al. |
| 2012/0264443 A1 | 10/2012 | Ng et al. |
| 2013/0170438 A1 | 7/2013 | Nishida et al. |
| 2014/0101303 A1* | 4/2014 | Gupta ............... H04W 28/0252 709/224 |
| 2014/0128110 A1* | 5/2014 | Wang ................... H04W 60/04 455/458 |
| 2015/0117285 A1* | 4/2015 | Xie ................... H04W 52/0216 370/311 |
| 2015/0139054 A1* | 5/2015 | Wu ................... H04W 52/0225 370/311 |
| 2016/0330786 A1* | 11/2016 | Okabe ................ H04W 76/028 |

FOREIGN PATENT DOCUMENTS

| | | |
|---|---|---|
| WO | 2013/119021 A1 | 8/2013 |
| WO | 2013/177992 A1 | 12/2013 |

\* cited by examiner

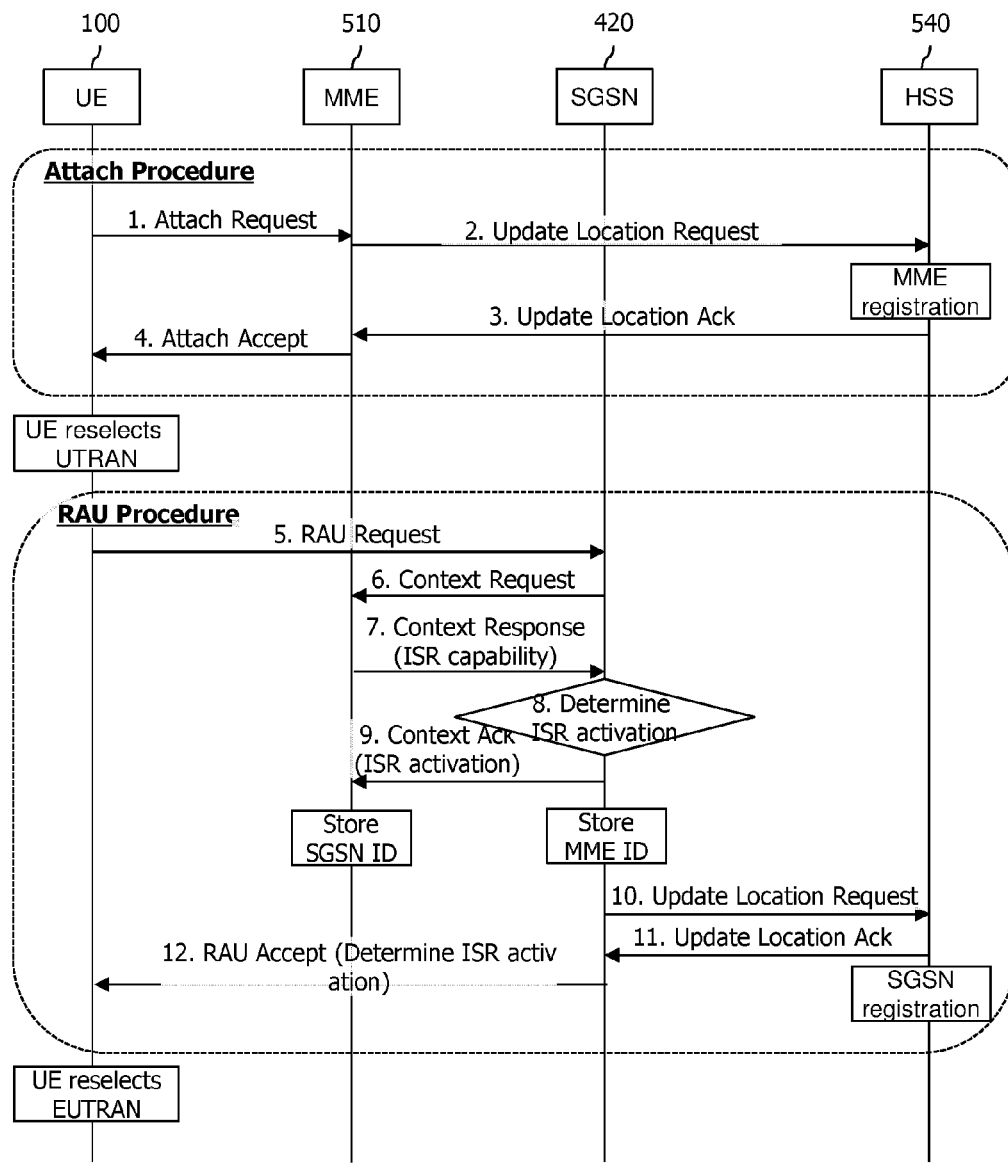

DOWNLINK DATA TRANSFER METHOD AND LOCATION UPDATE PROCEDURE EXECUTION METHOD

This application is a 35 USC § 371 National Stage entry of International Application No. PCT/KR2015/000044 filed Jan. 5, 2015, and claims priority to U.S. Provisional Application No. 61/926,403 filed Jan. 13, 2014, all of which are hereby incorporated by reference in their entireties as if fully set forth herein.

BACKGROUND OF THE INVENTION

Field of the Invention

The present invention relates to a method of transferring downlink data and a method of performing a location update procedure.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (the S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or the P-GW) 53 corresponds to the termination point of a data interface toward a packet data network. The PDN GW 53 can support policy enforcement features, packet filtering, charging support, etc. Furthermore, the PDN GW (or the P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are presented in the different function entities of an E-UTRAN and an EPC is called a reference point. Table 1 below defines reference points shown in FIG. 1. In addition to the reference points shown in the example of Table 1, various reference points may be presented depending on a network configuration.

TABLE 1

| Reference point | Description |
| --- | --- |
| S1-MME | Reference point for the control plane protocol between E-UTRAN and the MME |
| S1-U | Reference point between E-UTRAN and Serving GW for the per bearer user plane tunnelling and inter an eNodeB path switching during handover) |

TABLE 1-continued

| Reference point | Description |
|---|---|
| S3 | It enables user and bearer information exchange for inter 3GPP access network mobility in Idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | A reference point between the MME and the S-GW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common the EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the transmitter side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are presented in the physical layer of the transmitter side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are presented in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for transmitting, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently transmit an IP packet, such as IPv4 or IPv6, in a radio section having a small bandwidth when transmitting the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is presented between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are presented in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 transmits a randomly selected random access preamble to the eNodeB 20. Here, the UE 10 selects one of the 64 candidate random access preambles. Furthermore, the UE selects a subframe corresponding to the PRACH configuration index. The UE 10 transmits the selected random access preamble in the selected subframe.

The eNodeB 20 that has received the random access preamble transmits a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6a shows a situation where a UTRAN and an E-UTRAN coexist.

As can be seen from FIG. 6a, an eNodeB of the E-UTRAN (i.e., a 4G radio access network) may be deployed in a region in which a NodeB of the UTRAN (i.e., a 3G radio access network) exists.

A tracking area identity (TAI) list illustrated herein indicates an area in which the E-UTRAN provides a service in unit of an E-UTRAN location registration, and includes a cell of one or a plurality of eNodeBs.

In addition, a routing area (RA) illustrated herein indicates an area in which the UTRAN provides a service in unit of a UTRAN location registration, and includes a cell of one or a plurality of NodeBs.

A UE 100 illustrated herein is located at a boundary of the E-UTRAN and the UTARN, and may camp on any one of them. Herein, the camp-on implies that the UE 100 accesses a cell after finishing a cell selection procedure or a cell reselection procedure. If the UE 100 camps on an E-UTRAN cell, a location registration to an MME 510 is performed, and if the UE 100 camps on a UTRAN cell, a location registration to a serving general packet radio service support node (SGSN) 420 is performed.

However, as illustrated, if the UE 100 is located in the boundary of the E-UTRAN and the UTRAN, an unexpected cell reselection procedure is repeated and thus a location registration procedure is continuously performed, which may result in a waste of network resources.

FIG. 6b is a flowchart illustrating an idle mode signalign reduction (ISR) for solving the problem of FIG. 6a.

The ISR is a scheme for increasing efficiency of a network resource by reducing signaling for a location registration when a UE 100 moves back and forth between an E-UTRAN and a UTRAN. In the ISR scheme, if the UE 100 in an idle mode has moved back and forth one time between the E-UTRAN and the UTRAN and thus the location registration has been already achieved, the location registration may not be performed when the UE moves next time.

Detailed descriptions thereof are as follows.

Referring to FIG. 6b, a UE 100 first camps on an E-UTRAN cell, and thus the UE 100 sends an attach request message to perform a location registration to an HSS 540 via an MME 510. The MME 510 sends an update location request message to report to the HSS 540 that the UE 100 is attached.

In this case, the HSS 540 stores an identity (ID) of the MME 510 to which the UE 100 is attached, and sends an update location ACK message containing subscriber information to the MME 510 as a response. The MME 510 sends an attach accept message to the UE 100. Accordingly, the UE 100 completes an attach procedure on the MME 510 of the E-UTRAN cell on which the UE 100 camps Thereafter, it is assumed that the UE 100 moves from the E-UTRAN cell to a coverage area of a UTRAN cell. In this case, the UE 100 reselects the UTRAN. Therefore, the UE 100 must register its location to the UTRAN by performing a routing area update (RAU) procedure.

Accordingly, the UE 100 sends an RAU request message to a serving general packet radio service support node (SGSN) 420 to perform a location registration to the HSS 540 via the SGSN 420. The SGSN 420 recognizes from the RAU request message that the UE 100 has previously performed the location registration to the MME 510. Therefore, the SGSN 420 sends a context request message to the MME 510 to acquire a context for the UE 100 from the MME 510 to which the UE 100 has performed the location registration.

In response to the context request message sent by the SGSN 420, the MME 510 sends a context response message containing the context for the UE 100 to the SGSN 420. In this case, the MME 510 inserts a parameter 'ISR capability' or 'ISR supported' into the context response message, and thus reports to the SGSN 420 that the MME 510 can support the ISR capability. Meanwhile, context information for the UE 100 and included in the context response message representatively includes UE's mobility management (MM) context information and EPS PDN connections information. Herein, the EPS PDN connections information includes bearer context information. The MME 510 sets the context information for the UE 100 and to be included in the context response message on the basis of the MM context and EPS bearer context information for the UE 100 and maintained in the MME 510.

The SGSN 420 determines whether the ISR will be activated for the UE 100. More specifically, the SGSN 420 may analyze or confirm the parameter 'ISR capability' or 'ISR supported' of the context response message received from the MME 510, and thus confirm that the MME 510 supports the ISR capability. In addition, since the SGSN 420 also supports the ISR capability, the SGSN 420 determines to activate the ISR.

The SGSN 420 determines the activation of the ISR capability. Therefore, the SGSN 420 sends a context ACK message to the MME 510 in response to the context response message sent by the MME 510. In this case, a parameter 'ISR activated' is inserted to the context ACK message so as to report to the MME 510 that the ISR capability is activated for the UE 100.

Meanwhile, if the ISR is activated, the SGSN 420 and the MME 510 store mutual identities (IDs). In addition, the MME 510 which has received the context ACK message including the parameter 'ISR activated' from the SGSN 420 continuously maintains the context for the UE 100.

The SGSN 420 sends an update location request message to the HSS 540 to report the location registration of the UE 100. In addition, the HSS 540 stores an ID of the SGSN 420 for which the UE 100 performs the RAU, and sends an update location ACK message containing subscriber information of the UE 100 to the SGSN 420 as a response.

The SGSN 420 sends an RAU accept message to the UE 100. In this case, a parameter 'ISR activated' is inserted to the RAU accept message so as to report that the ISR capability is activated for the UE 100.

It is described above that the location of the UE is registered through the attach procedure and the RAU procedure. Further, the MME 510 and the SGSN 420 support the ISR capability, and thus the ISR is activated.

Therefore, even if the UE 100 moves again from the UTRAN to the E-UTRAN and thus the E-UTRAN cell is reselected, the UE 100 does not have to perform the location registration to the MME 510 since the ISR is currently activated.

That is, after the ISR is activated, the location registration to the network is not necessarily performed again as long as the UE 100 is within a routing area (RA) registered through the SGSN 420 and a tracking area identity (TAI) list registered through the MME 510. This capability is the ISR. Meanwhile, the RA registered through the SGSN 420 and the TAI list registered through the MME 510 are referred to together as an ISR area. As described above, if the UE frequently moves between the E-UTRAN and the UTRAN/GERAN, the ISR capability can reduce a waste of network resources by avoiding a repetitive location registration procedure.

Meanwhile, the ISR activation must be updated whenever the UE 10 performs the RAU/TAU procedure. That is, if the ISR activated parameter does not exist in the TAU/RAU accept message received from the MME 51 and the SGSN 41, the ISR is deactivated.

In the UE 10, the MME 51, and the SGSN 41, a periodic TAU/RAU timer (e.g., T3412 for E-UTRAN and T3312 for UTRAN) runs independently for E-UTRAN and GERAN/UTRAN. Therefore, the UE 10 camping on a corresponding network performs a periodic TAU or RAU at the expiry of a periodic TAU/RAU timer related to the corresponding network. Even if the periodic RAU timer (e.g., T3312) expires when camping on LTE, the periodic RAU is not performed. In this case, an ISR deactivation timer (e.g., T3323) runs, and if the ISR deactivation timer (e.g., T3323) expires, the UE 10 deactivates the ISR. Otherwise, the ISR deactivation timer (e.g., T3323) runs, and if this timer expires, the UE 10 deactivates the ISR.

If the MME 51 or the SGSN 41 fails to receive a periodic TAU/RAU request message from the UE 10, the MME 51 or the SGSN 41 regards that the UE 10 is unreachable in the network. For this, the MME 51 or the SGSN 41 drives a reachable timer (e.g., a mobile reachable timer) (in general, it is set to a value of: 4 min+T3412/T3312). If the reachable timer expires, an implicit detach timer is driven again. If the implicit detach timer also expires, it is regarded that the UE 10 is finally unreachable, and the UE is detached.

FIG. 6c illustrates a paging procedure after an ISR is activated.

After the ISR is activated, if downlink data to be transmitted to a UE 10 arrives at an S-GW 52, the S-GW 52 transmits a downlink data notification (DDN) to both of an MME 51 and an SGSN 41. Therefore, the MME 51 and the SGSN 41 transmit respective paging signals to the UE 10. Accordingly, the UE 10 transmits a service request message to any one of the MME 51 and the SGSN 41 in response to the paging. Then, if any one of the MME 51 and the SGSN 41 receives the service request message from the UE 10, a user plane for receiving the downlink data is set up. Then, the S-GW 41 transmits a stop paging message to the other one between the MME 51 and the SGSN 41.

Meanwhile, recently, there is ongoing research on machine type communication (MTC) as communication achieved between one machine and another machine, excluding a human intervention.

Remarkably, it is most important for the MTC device to use a battery as long as possible since there is almost no human intervention. For this, there is ongoing research for allowing the MTC device to operate in a power saving mode (PSM). When the MTC device enters a PSM state, downlink data cannot be received similarly in a power-off state.

As such, although the MTC device in the PSM state cannot receive downlink data, the MME/SGSN problematically transmits a paging signal continuously in a state where the ISR is activated as described above.

SUMMARY OF THE INVENTION

Accordingly, one disclosure of the present specification aims to provide a method capable of solving the aforementioned problem.

In order to solve the aforementioned aim, one disclosure of the present specification provides a method of transferring downlink data. The method may be performed by a serving gateway (S-GW) and include: transmitting a Downlink Data Notification (DDN) message to a Mobility Management Entity (MME) and a Serving General Packet Radio Service (GPRS) Supporting Node (SGSN), when downlink data arrives at a wireless device in a state where an Idle mode Signaling Reduction (ISR) is activated; receiving a message notifying of a DDN refusal from any one of the MME and SGSN when the wireless device cannot receive the downlink data since it is in a power saving mode (PSM); and transmitting a paging stop request message to any one of the MME and SGSN upon receiving the message notifying of the refusal of the DDN.

The message notifying of the DDN refusal may be a DDN confirmation message including a refusal cause or a message different from the DDN accept message.

If the MME supports the PSM of the wireless device but the SGSN does not support the PSM of the wireless device, the message notifying of the DDN refusal may be received from the MME.

If the MME does not support the PSM of the wireless device but the SGSN supports the PSM of the wireless device, the message notifying of the DDN refusal may be received from the SGSN.

In order to solve the aforementioned aim, one disclosure of the present specification provides a Serving Gateway (S-GW). The S-GW may include a transceiver; and a controller for controlling the transceiver. The controller may be configured for transmitting a Downlink Data Notification (DDN) message to a Mobility Management Entity (MME) and a Serving General Packet Radio Service (GPRS) Supporting Node (SGSN) when downlink data arrives at a wireless device in a state where an Idle mode Signaling Reduction (ISR) is activated, receiving a message notifying of a DDN refusal from any one of the MME and SGSN when the wireless device cannot receive the downlink data since it is in a power saving mode (PSM), and transmitting a paging stop request message to any one of the MME and SGSN.

In order to solve the aforementioned aim, another disclosure of the present specification provides a method of performing a locate update procedure. The method may be performed by a network entity and include: receiving a location update request message including an active time value for a Power Saving Mode (PSM) from a wireless device in a state where an Idle mode Signaling Reduction (ISR) is activated; transmitting a context request message to an old network entity of the wireless device upon receiving the uplink request message; and receiving a context response message from the old network entity. Herein, the context request message may include information regarding whether the network entity support the PSM. In addition, the context response message may include information regarding whether the old network entity support the PSM. Therefore, the method may further include determining whether to deactivate the ISR on the basis of the information regarding whether to support the PSM; and if it is determined to deactivate the ISR, transmitting a location update accept message including an indicator for notifying the ISR deactivation to the wireless device.

The location update procedure may be a Tracking Area Update (TAU) procedure or a Routing Area Update (RAU) procedure. The location update request message may be a TAU request message or an RAU request message. The location update accept message may be a TAU accept message or an RAU accept message. Herein, if the network entity is a Mobility Management Entity (MME) and the old network entity is an SGSN, the location update request message may be the TAU request message, and the location update accept message is the TAU accept message. In addition, if the network entity is an SGSN and the old network entity is an MME, the location update request message may be the RAU request message, and the location update accept message may be the RAU accept message.

The method may further include, if it is determined to deactivate the ISR, transmitting a context confirmation message including an indication for notifying the ISR deactivation to the old network entity.

The location update accept message may further include an active time value for a PSM determined by the network entity.

In order to solve the aforementioned aim, another disclosure of the present specification provides a network entity performing a location update procedure. The network entity may include: a transceiver; and a controller for controlling the transceiver. The controller may perform the steps of: receiving a location update request message including an active time value for a Power Saving Mode (PSM) from a wireless device in a state where an Idle mode Signaling Reduction (ISR) is activated; transmitting a context request message to an old network entity of the wireless device upon receiving the uplink request message, and receiving a context response message from the old network entity. Herein, the context request message may include information regarding whether the network entity support the PSM. In addition, the context response message may include information regarding whether the old network entity support the PSM. Therefore, the controller may further perform the step of: determining whether to deactivate the ISR on the basis of the information regarding whether to support the PSM; and if it is determined to deactivate the ISR, transmitting a location update accept message including an indicator for notifying the ISR deactivation to the wireless device.

According to the disclosure of the present specification, the aforementioned problem of the conventional technique can be solved.

BRIEF DESCRIPTION OF THE DRAWINGS

FIG. 6b is a flowchart illustrating an idle mode signalign reduction (ISR) for solving the problem of FIG. 6a.

FIG. 9b illustrates an example of a signal flow in the problematic situation of FIG. 9a.

FIG. 11b is a signal flow specifically illustrating the TAU procedure of FIG. 11a.

FIG. 12b is a signal flow specifically illustrating the RAU procedure of FIG. 12a.

DESCRIPTION OF EXEMPLARY EMBODIMENTS

Figure 1:
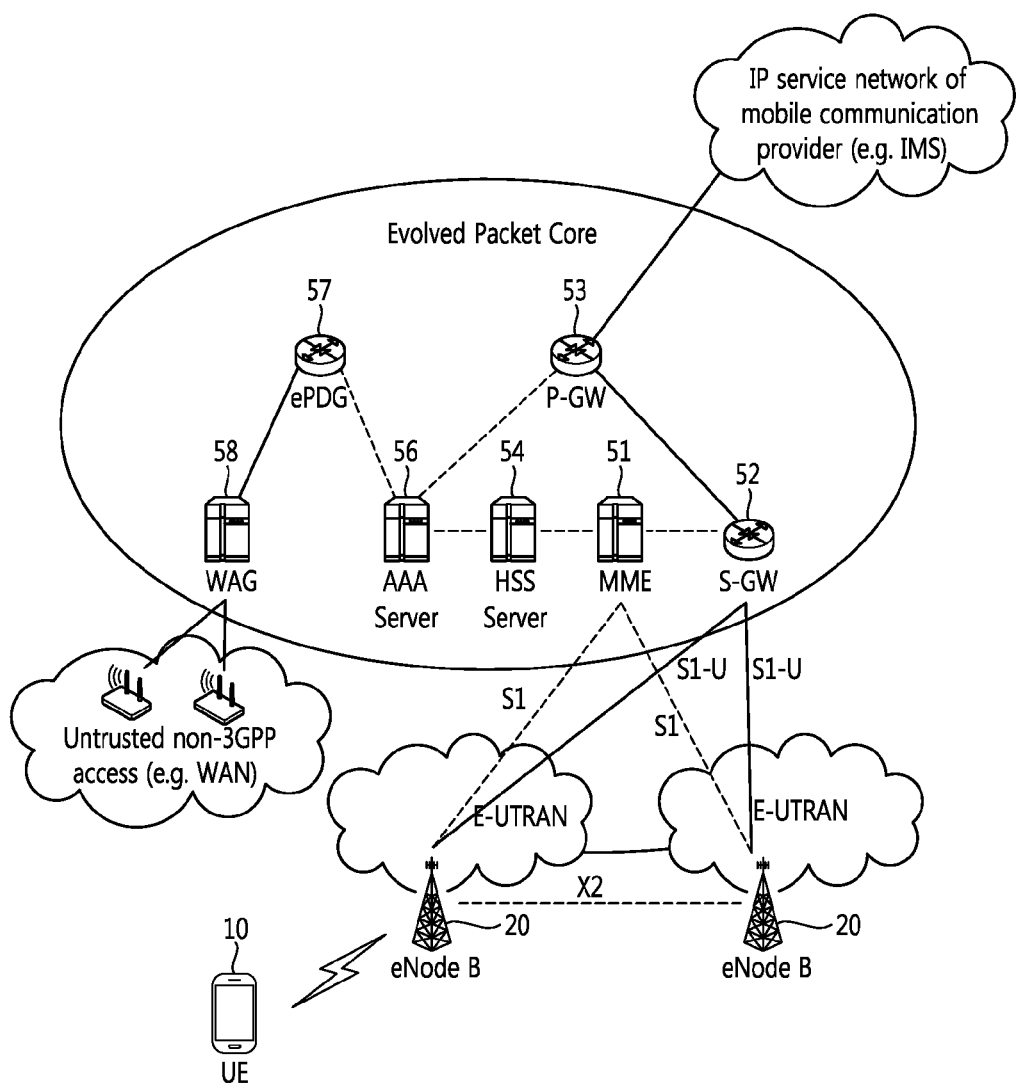
FIG. 1 shows the configuration of an evolved mobile communication network.
Figure 2:
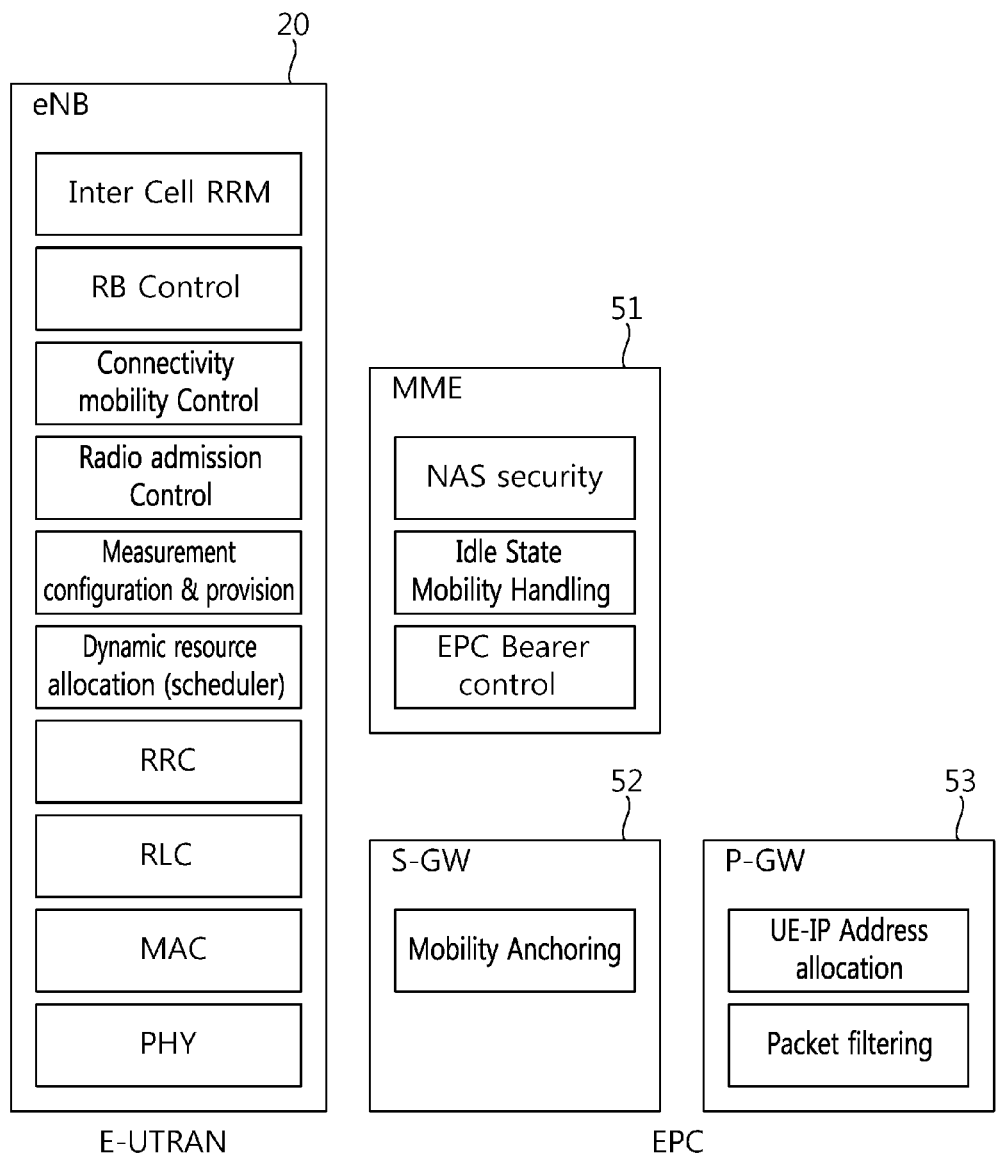
FIG. 2 is an exemplary diagram showing the architecture of a common E-UTRAN and a common EPC.
Figure 3:
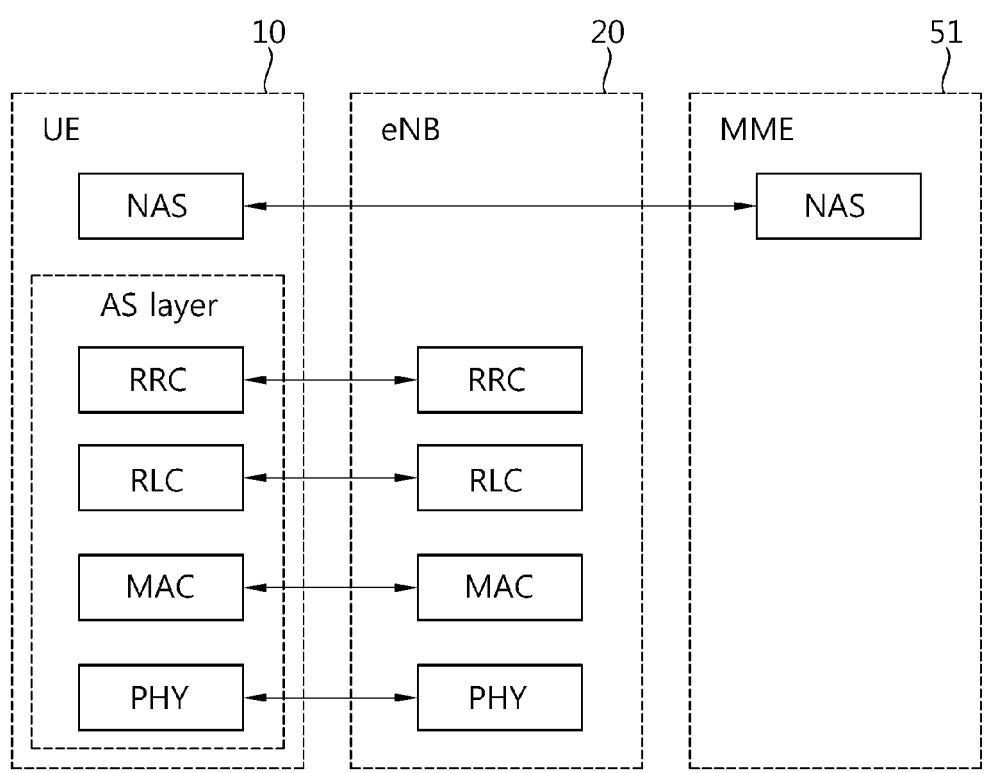
FIG. 3 is an exemplary diagram showing the structure of a radio interface protocol in a control plane between a UE and an eNodeB.
Figure 4:
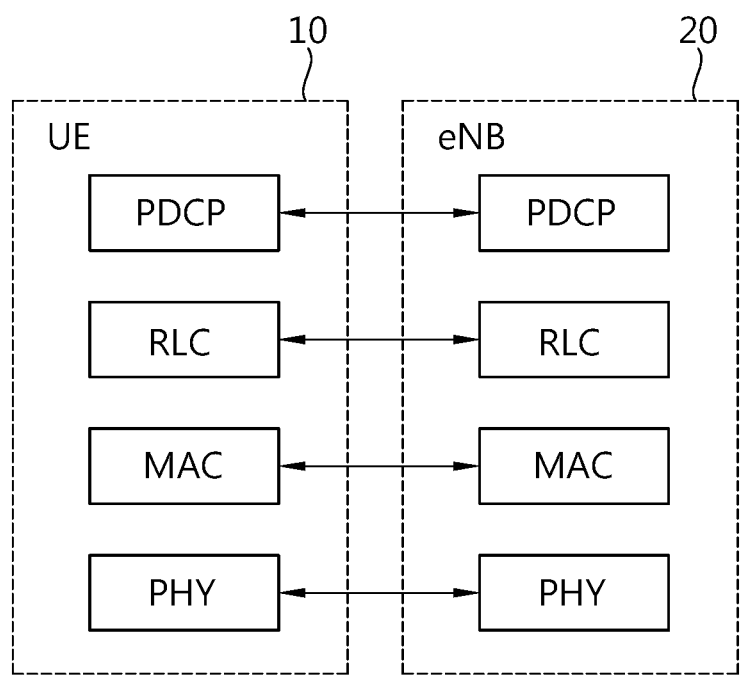
FIG. 4 is another exemplary diagram showing the structure of a radio interface protocol in a control plane between a UE and an eNodeB.
Figure 5:
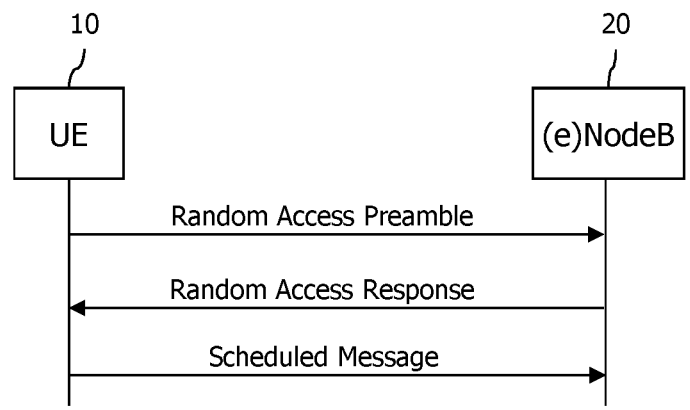
FIG. 5 is a flowchart illustrating a random access process in 3GPP LTE.
Figure 6A:
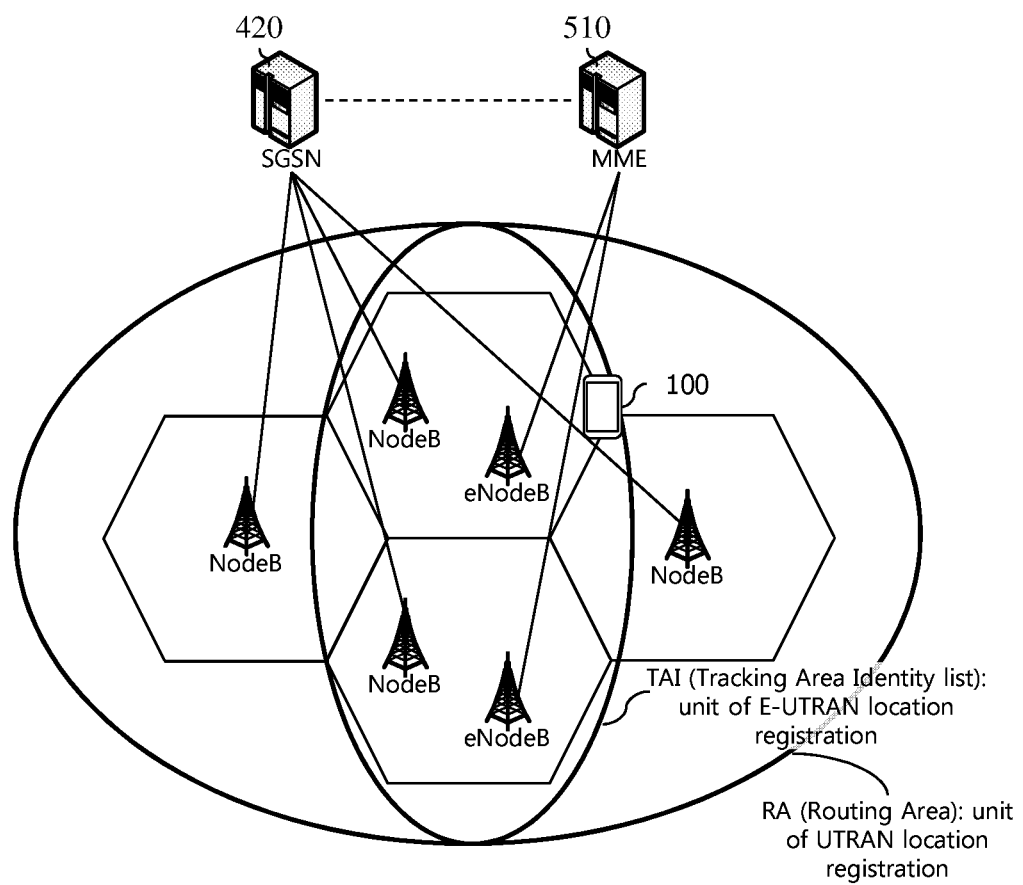
FIG. 6a shows a situation where a UTRAN and an E-UTRAN coexist.
Figure 6C:
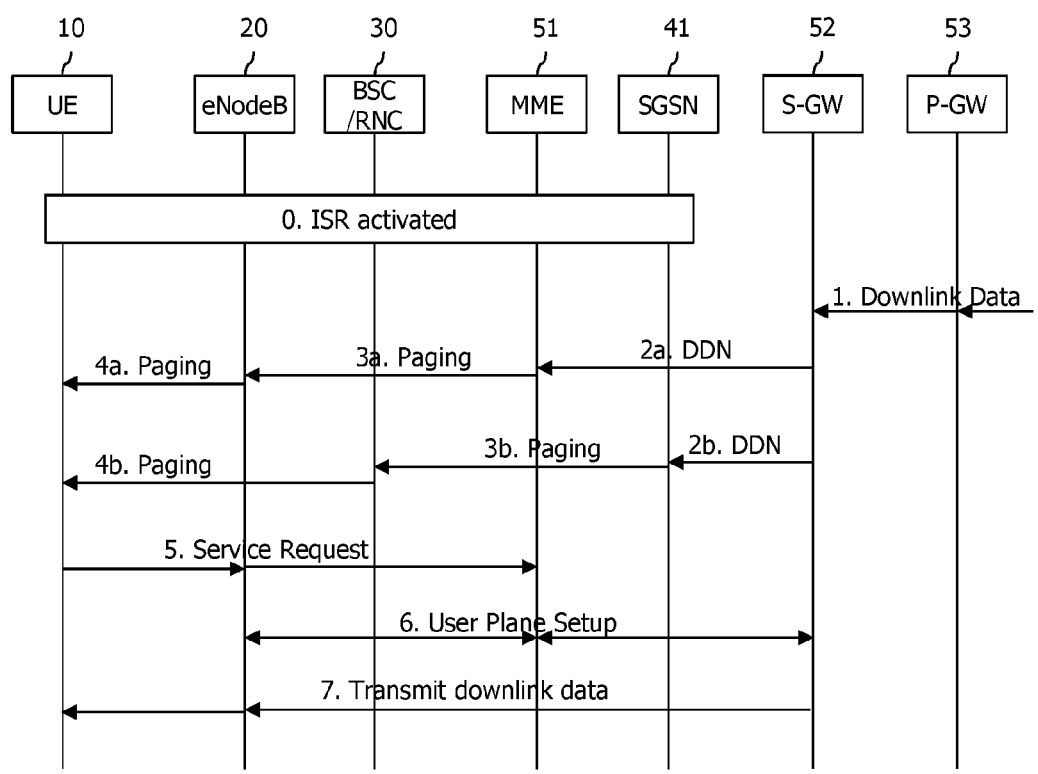
FIG. 6c illustrates a paging procedure after an ISR is activated.

The presented invention is described in light of UMTS (Universal Mobile Telecommunication System) and the EPC (Evolved Packet Core), but not limited to such communication systems, and may be rather applicable to all communication systems and methods to which the technical spirit of the presented invention may apply.

The technical terms used herein are used to merely describe specific embodiments and should not be construed as limiting the presented invention. Further, the technical terms used herein should be, unless defined otherwise, interpreted as having meanings generally understood by those skilled in the art but not too broadly or too narrowly. Further, the technical terms used herein, which are determined not to exactly represented the spirit of the invention, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented invention.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented invention will be described in greater detail with reference to the accompanying drawings. In describing the presented invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smart phone, a multimedia device, or other portable device or may be a stationary device, such as a PC or a car-mounted device.

Definition of Terms

For better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality MTC: Machine Type Communication which is communication achieved between devices or between a device and a server without a human intervention.

MTC device: A UE which serves for a specific purpose having a communication function through a core network, for example, a vending machine, a meter reading device, a weather sensor, etc. The MTC device may be also referred to as an MTC terminal, an MTC apparatus, an MTC machine, an MTC UE, a UE user for MTC, a UE configured for MTC, etc.

MTC server: A server which manages the MTC device and exchanges data on a network. The server may exist outside the core network.

MTC application: An actual application using the MTC device and the MTC server (e.g., remote meter reading, product delivery tacking, etc.).

MTC feature: A function or feature of a network for supporting the application. That is, some features are required according to a usage of each application. Examples thereof include MTC monitoring (required for remote meter reading or the like for a lost device), a low mobility (almost no movement in case of the vending machine), small data transmission (only small amount of data is transmitted/received by the MTC device), etc.

NAS (Non-Access-Stratum): A higher stratum of a control plane between a UE and an MME. The NAS supports mobility management, session management, IP address management, etc., between the UE and the network.

<Machine Type Communication (MTC)>

Machine Type Communication (MTC) implies communication between one machine and another machine, excluding a human intervention, and a device used in this case is called an MTC device. A service provided through the MTC device is distinguished from a communication service based on the human intervention, and may be applied to various ranges of services.

Figure 7A:
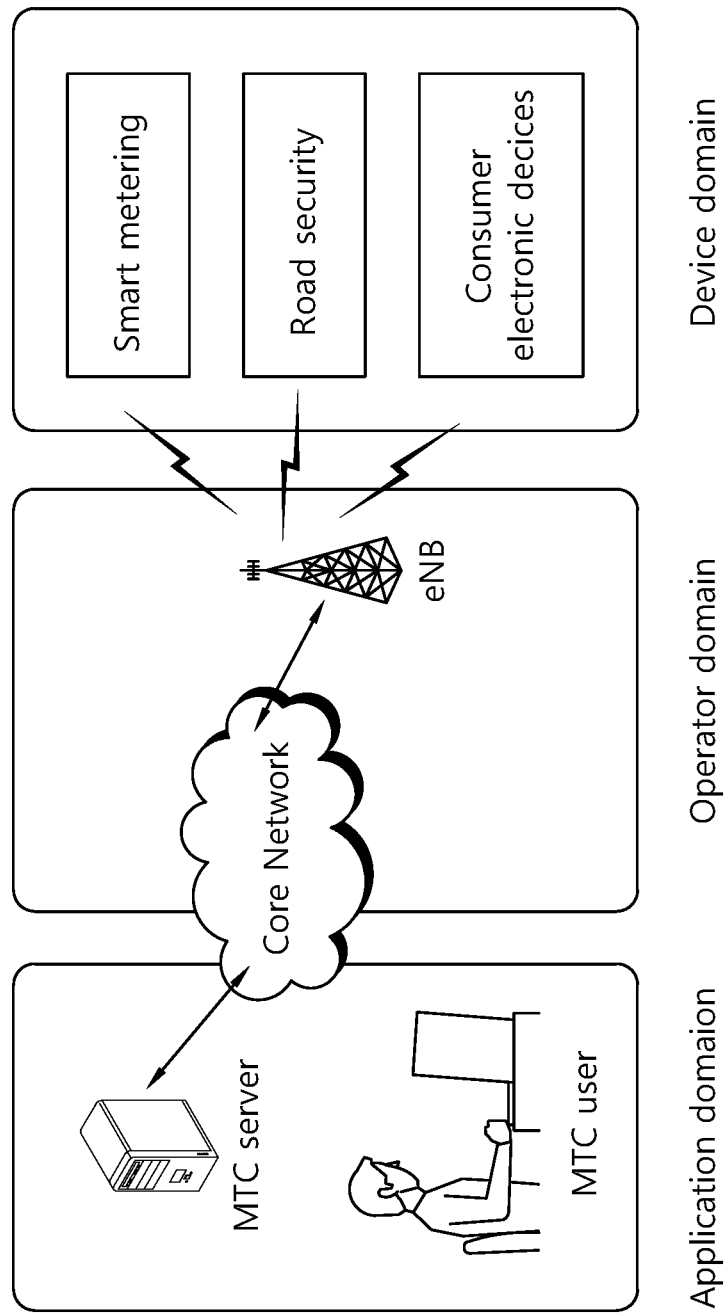
FIG. 7a shows an example of a service via an MTC device.

FIG. 7a shows an example of a service via an MTC device.

The service via the MTC device may be classified into several types. For example, there is a service for monitoring a variety of information by the MTC device and a service for monitoring a variety of information by an eNodeB or an entity in a core network.

Referring to FIG. 7a, as an example of the aforementioned first service, it is shown that a measuring service, a road information service, a user electronic device control service, etc., can be provided via the MTC device. Herein, when the MTC device monitors measuring information, road traffic information, etc., and transmits it to the eNodeB, the eNodeB may transmit it to an MTC server, and thus an MTC user may use a provided service.

As an example of the aforementioned second service, a service of monitoring a movement of an MTC device placed in things may be taken into consideration. More specifically, the MTC device may be attached to, for example, a fixed thing such as a vending machine or a moving thing such as a vehicle, and the eNodeB or the entity in the core network may monitor a path on which the MTC device moves.

Figure 7B:
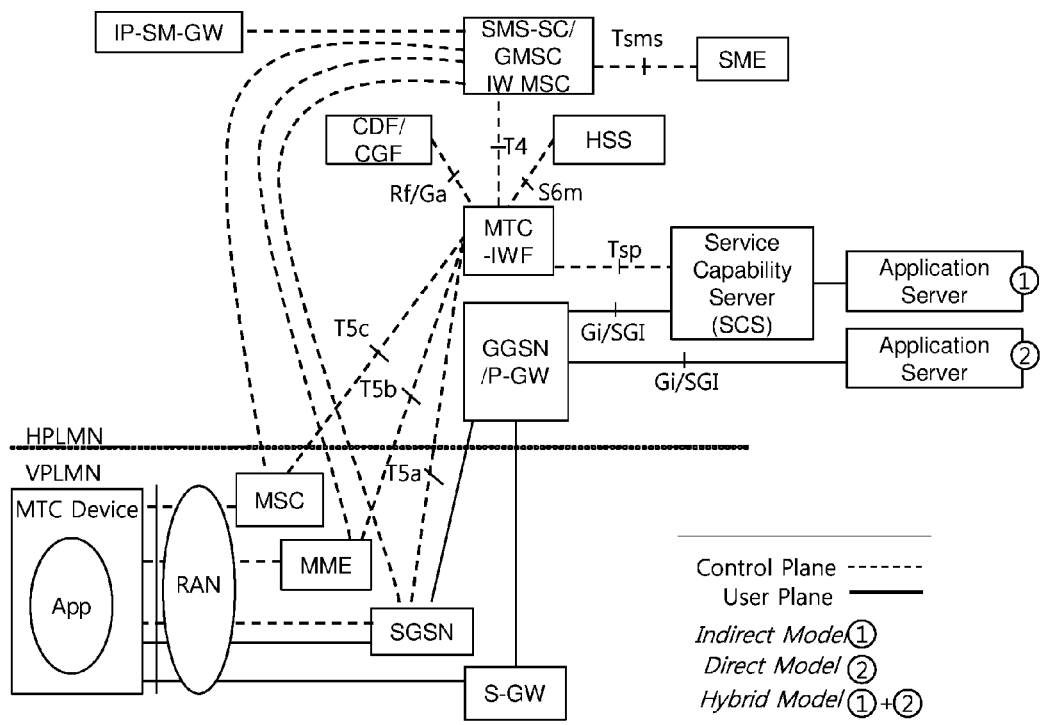
FIG. 7b is a conceptual view illustrating a 3GPP service model for supporting MTC.

FIG. 7b is a conceptual view illustrating a 3GPP service model for supporting MTC.

An MTC device (or an MTC UE) and an end-to-end application between MTC applications may use services provided by a 3GPP system and selective services provided by the MTC server. The 3GPP system may include transmission and communication services (including a 3GPP bearer service, an IMS, and an SMS) including various optimizations for facilitating the MTC. It is shown in FIG. 7b that the MTC device is connected to a 3GPP network (e.g., UTRAN, E-UTRAN, GERAN, I-WLAN, etc.) through an Um/Uu/LTE-Uu interface. The architecture of FIG. 7b includes various MTC models (e.g., a direct model, an indirect model, and a hybrid model).

Entities shown in FIG. 7b are now described.

In FIG. 7b, an application server is a server on a network on which an MTC application is executed. The aforementioned various techniques for implementing the MTC applications may be applied to the MTC application server, and a detailed description thereof will be omitted. In addition, in FIG. 7b, the MTC application server may access the MTC server through a reference point API, and a detailed description thereof will be omitted. Alternatively, the MTC application server may be collocated with the MTC server.

The MTC server (e.g., a Services Capability Server (SCS) shown in the figure) is a server on a network for managing an MTC UE, and may be connected to a 3GPP network to communicate with a UE used for MTC and nodes of PLMN.

An MTC-InterWorking Function (MTC-IWF) may control interworking between an MTC server and an operator core network, and may play a role of a proxy of an MTC operation. To support the MTC indirect or hybrid model, one or more MTC-IWFs may exist in a Home PLMN (HPLMN). The MTC-IWF may relay or interpret a signaling protocol on a reference point Tsp to operate a specific function in the PLMN. The MTC-IWF may perform a function for authenticating an MTC server before the MTC server establishes communication with a 3GPP network, a function for authenticating a control plane request from the MTC server, various functions related to a trigger indication described below, etc.

An SMS-SC (Short Message Service-Service Center)/IP-SM-GW (Internet Protocol Short Message GateWay) may manage transmission/reception of a Short Message Service (SMS). The SMS-SC may relay a short message between a Short Message Entity (SME) (i.e., an entity for transmitting or receiving a short message) and a mobile station and may serve for a storing-and-delivering function. The IP-SM-GW may serve for a protocol interaction between an IP-based UE and the SMS-SC.

A CDF (Charging Data Function)/CGF (Charging Gateway Function) may perform an accounting related operation.

An HLR/HSS may perform a function for storing subscriber information (e.g., IMSI, etc.), routing information, configuration information, etc., and for providing it to the MTC-IWF.

An MSC/SGSN/MME may perform a control function such as mobility management, authentication, resource allocation, etc., for network connection of the UE. Regarding triggering described below, a function for receiving a trigger indication from the MTC-IWF and for processing it in a form of a message provided to the MTC UE may be performed.

A GGSN (Gateway GPRS Support Node)/S-GW (Serving-Gateway)+P-GW (Packet Data Network-Gateway) may perform a function of a gateway which serves for connection of a core network and an external network.

Table 2 below is a summary of an important reference point in FIG. 7b.

TABLE 2

| Reference point | Description |
| --- | --- |
| Tsms | It is the reference point used by an entity outside the 3GPP system to communicate with UEs used for MTC through an SMS. |
| Tsp | It is the reference point used by an entity outside the 3GPP system to communicate with the MTC-IWF related control plane signalling. |
| T4 | Reference point used by the MTC-IWF to route device trigger to the SMS-SC in the HPLMN. |
| T5a | Reference point used between the MTC-IWF and the serving SGSN. |
| T5b | Reference point used between the MTC-IWF and the serving MME. |
| T5c | Reference point used between the MTC-IWF and the serving MSC. |
| S6m | Reference point used by the MTC-IWF to interrrogate the HSS/HLR for E.164 MSISDN (Mobile Station International Subscriber Directory Number) or external identifier mapping to IMSI and gather UE reachability and configuration information. |

At least one of the reference points T5a, T5b, and T5c is referred to as T5.

Meanwhile, user plane communication with the MTC server in case of the indirect and hybrid model and communication with the MTC application in case of the direct and hybrid model may be performed by using the existing protocol through reference points Gi and SGi.

<Power Saving Mode (PSM)>

Meanwhile, according to a characteristic of an MTC device, uplink mobile originating data may be transmitted periodically instead of receiving mobile terminating data not frequently. Considering this characteristic, in order to maximize energy efficiency, the MTC device may operate in a power saving mode (hereinafter, PSM).

When entering the PSM state, since the MTC device deactivates an access stratum (AS), the PSM is similar to a power-off state. However, in the PSM state, the MTC device may exist in a state of being registered to a network, and thus the MTC device does not have to re-attach to the network, and also does not have to re-establish a PDN connection. Therefore, the PSM state and the power-off state are differentiated.

Once entering the PSM state, the MTC device stays in the PSM state, for example, until periodic TAU/RAU or uplink mobile originating data or mobile originating events such as detach allows the MTC device to start a certain procedure on a network.

Even in case of staying in the PSM state, the MTC device may be always released from the PSM whenever a mobile originating service is necessary. That is, even in case of staying in the PSM state, the MTC device may activate an access stratum (AS) anytime as to a mobile originated service, and may resume an operation of an idle mode.

On the other hand, if a mobile reachable timer expires and an active time of the MTC device expires, the MME may know that the MTC device enters the PSM state and thus paging is impossible.

Meanwhile, if the MTC device once enters the PSM state, a mobile terminating service cannot be immediately received. In other words, if the MTC device enters the PSM state, a response for the mobile terminating service is possible only during an active time period after a mobile originated event such as signal transmission or data transmission after a periodic tracking area update (TAU) or routing area update (RAU) procedure.

Therefore, the PSM is suitable for an MTC device which requests a mobile originating service and a mobile terminating service, and also is suitable only for an MTC device which can endure a specific latency in communication.

Meanwhile, the MTC device has to request for an active time long enough to receive data such as a latent mobile terminated service or an SMS.

When the MTC device desires to use the PSM, the MTC device has to request for an active time value during the attach and TAU/RAU procedure. If the network supports the PSM and the MTC device accepts to use the PSM, the active time value is allocated to the MTC device. The network may determine the active time value to be allocated to the MTC device by considering the active time value requested by the MTC device and an MME/SGSN configuration. If the active time value allocated by the network is not satisfactory, the MTC device may request for an active time value desired by the MTC device only during a period of the TAU/RAU procedure to be performed next.

Further, the MTC device to which the PSM is applicable requests the network for a periodic TAU/RAU timer value suitable for latency/responsiveness for mobile terminated services during the attach and TAU/RAU procedure. If the network allocates the periodic TAU/RAU timer value to the MTC device but the MTC device is not satisfied, the MTC device may request for the periodic TAU/RAU timer desired by the MTC device only during the period of the TAU/RAU procedure to be performed next.

As a result, if it is desired to support and use the PSM, the MTC device has to request the network for the active time value and the periodic TAU/RAU timer value together during each attach and TAU procedure. Likewise, although there is no request of the MTC device, the network cannot randomly allocate the active time value.

Meanwhile, the following description is made with reference to the accompanying drawings.

Figure 8A:
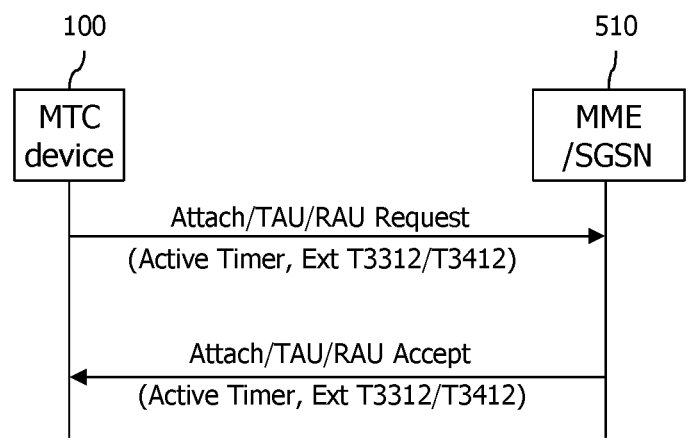
FIG. 8a illustrates a process of negotiating an active timer for a power saving mode (PSM), and FIG. 8b and FIB. 8c illustrate an operation of the PSM.
Figure 8B:
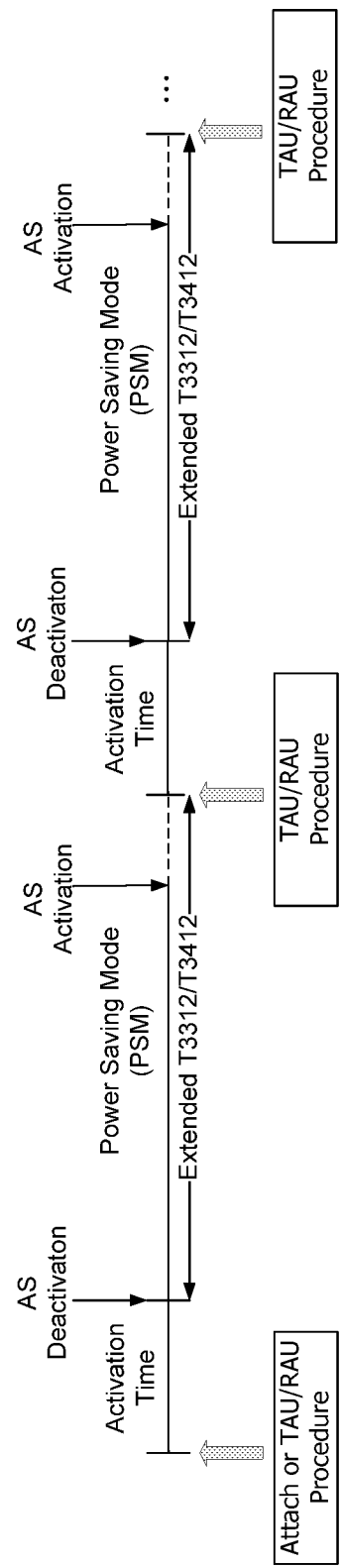

FIG. 8a illustrates a process of negotiating an active timer for a power saving mode (PSM), and FIG. 8b and FIB. 8c illustrate an operation of the PSM.

As shown in FIG. 8a, an MTC device 100 transmits a requested active time value (i.e., active timer value) and a periodic TAU/RAU timer (e.g., Ext T3412 or Ext T3312) to an MME/SGSN 510 by including the values to an attach request message or a TAU request message. Upon receiving the request message, the MME/SGSN 100 confirms whether the PSM is supported, and if it is supported, transmits the attach accept message or the TAU/RAU accept message including the active time value (i.e., active timer value) and the periodic TAU/RAU timer value (e.g., Ext T3412 or Ext T3312) to the MTC device 100. In this case, the active time value (i.e., active timer value) and the periodic TAU/RAU timer value (e.g., Ext T3412 or Ext T3312) included in the accept message may be a value desired by the MME/SGSN. However, the periodic TAU/RAU timer value (e.g., Ext T3412 or Ext T3312) may not be included herein. In this case, the MTC device may use a default value for the periodic TAU/RAU timer value (e.g., Ext T3412 or Ext T3312). Alternatively, even if the MTC device does not allow the request message to include the periodic TAU/RAU timer value (e.g., Ext T3412 or Ext T3312), the MME may transmit the accept message including the value by performing a configuration desired by the MME.

Meanwhile, as shown in FIG. 8*b* and FIB. 8*c*, if the MTC device requests for the active time value and the network allocates the active time value, the MTC device drives an active timer according to the allocated active time value. Likewise, when transitioning from ECM_CONNECTED to ECM_IDLE, the MME drives a mobile reachable timer on the basis of the active time value.

Figure 8C:
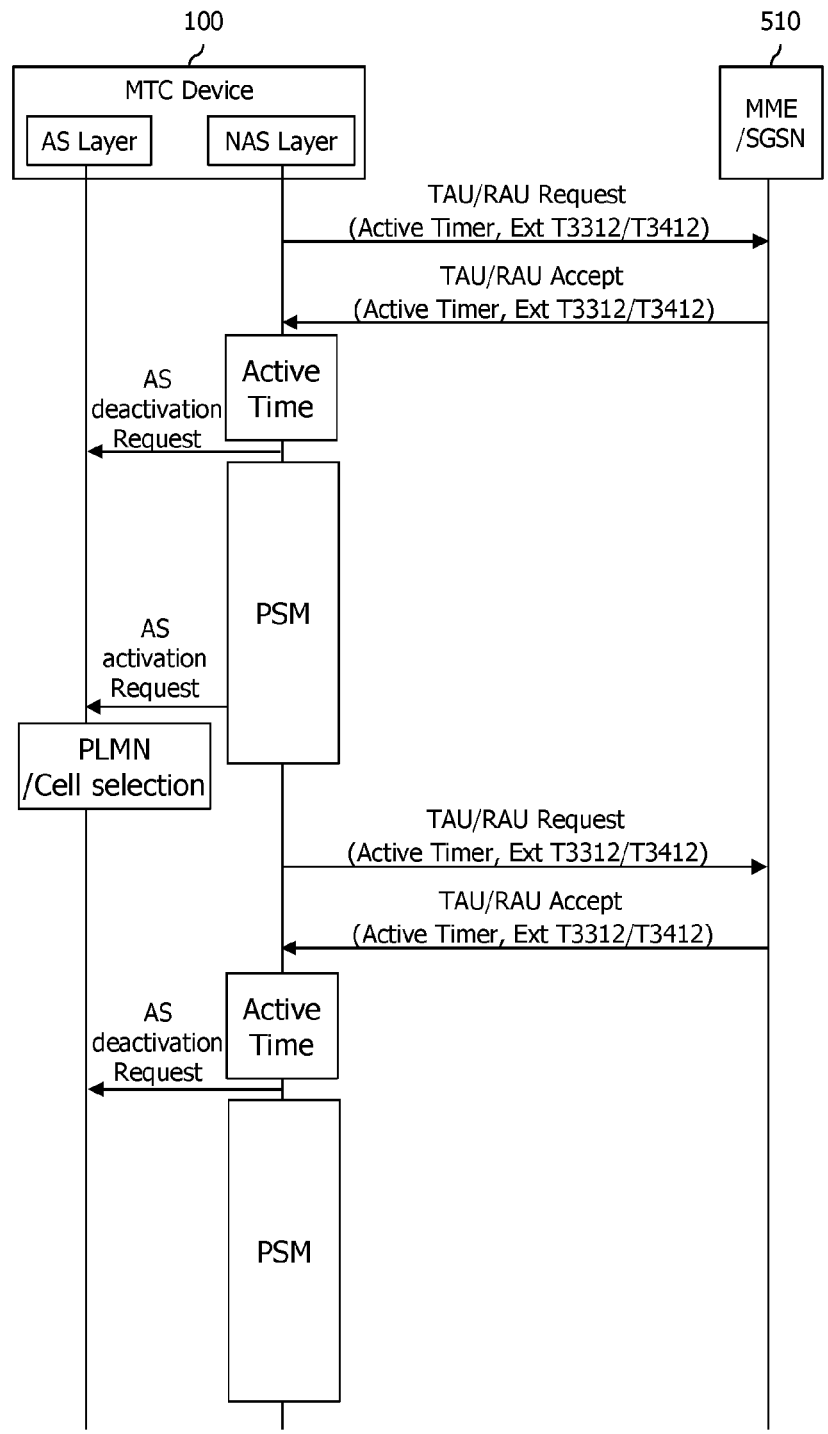

In addition, as shown in FIG. 8*b* and FIG. 8*c*, when the active timer expires, the MTC device deactivates its access stratum (AS) and transitions to the PSM state. In the PSM state, due to the deactivation of the AS, the MTC device stops all procedures of an idle mode, but drives an NAS timer, for example, a periodic TAU/RAU timer (e.g., Ext T3412 or Ext T3312).

The MTC device does not re-activate the access stratum (AS) before the periodic TAU/RAU timer (e.g., Ext T3412 or Ext T3312) is performed at the expiry of the periodic TAU/RAU timer (e.g., Ext T3412 or Ext T3312), and does not resume the procedure of the idle mode.

When it is immediately before the expiry of the periodic TAU/RAU timer (e.g., Ext T3412 or Ext T3312), the MTC device re-activates the access stratum (AS), and performs a radio access configuration procedure (PLMN selection or cell selection) required to configure communication with EPC.

At the expiry of the periodic TAU/RAU timer (e.g., Ext T3412 or Ext T3312), the MTC device performs again the TAU/RAU procedure, and subsequently enters the PSM state after the active time expires.

Figure 9A:
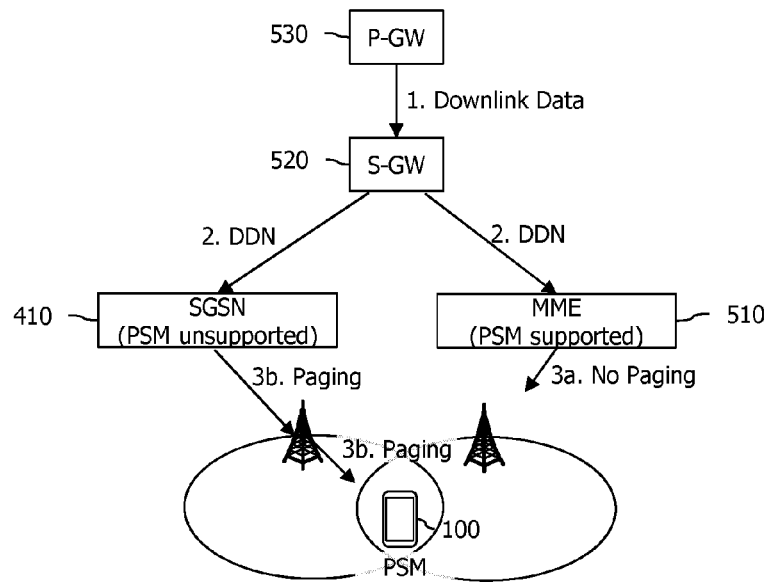
FIG. 9a briefly illustrates a problem when a PSM and an ISR are simultaneously applied.
Figure 9B:
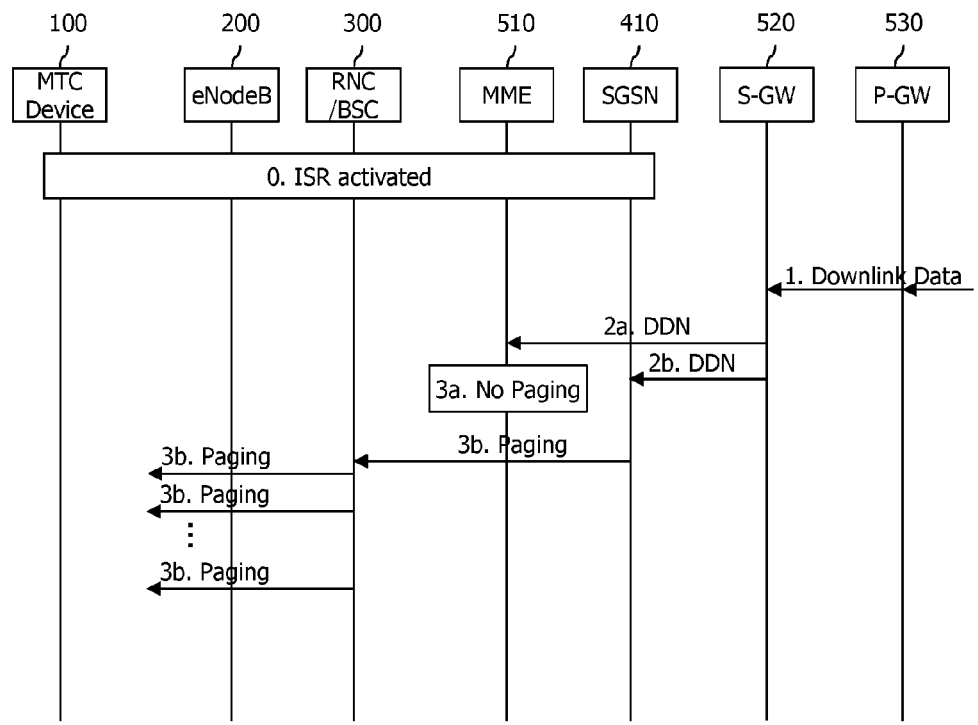

FIG. 9*a* briefly illustrates a problem when a PSM and an ISR are simultaneously applied, and FIG. 9*b* illustrates an example of a signal flow in the problematic situation of FIG. 9*a*.

As can be seen from FIG. 9*a*, it is assumed that the ISR is activated, and an MTC device 100 is in a PSM state. In addition, it is assumed that the MTC device 100 in the PSM state is supported by an MME 510, but is not supported by an SGSN 410.

Under this assumption, if an S-GW 520 receives downlink data, the S-GW 520 transmits a DDN to both of the MME 510 and the SGSN 410 since the ISR is activated.

In this case, since the MME 510 is aware that the MTC device 100 is in the PSM state, a DDN refusal message is transmitted to the S-GA 520, and a paging signal is not transmitted to the MTC device 100.

On the other hand, since the SGSN 410 does not support the PSM, the paging signal is transmitted to the MTC device 100 through an eNodeB. However, even if the paging signal is transmitted to the MTC device 100, the MTC device 100 cannot receive the paging signal since it is in the PSM state.

Therefore, the SGSN 410 repetitively transmits the paging signal during a specific time period of by a specific number of times.

As such, the transmitting of the paging signal to the MTC device 100 in the PSM state is an unnecessary operation, which causes an unnecessary waste of network resources.

Unlike in FIG. 9*a* and FIG. 9*b*, even if it is assumed that the MTC device 100 in the PSM state is supported by the SGSN 410 and is not supported by the MME 510, similarly, the MME 510 repetitively transmits the paging signal during a specific time period or by a specific number of times since it does not know that the MTC device 100 is in the PSM state and thus cannot receive the paging signal.

Disclosures of the Present Specification

Accordingly, a disclosure of the present specification proposes solutions for solving the aforementioned problem.

According to a solution of a first disclosure, if any one of the MME 510 and the SGSN 410 receives a DDN from the S-GW 520 in a situation where the ISR is activated or in a situation where only any one of the MME 510 and the SGSN 410 supports the PSM of the MTC device 100, the S-GW 520 is allowed to transmit a paging stop request message to the other device not supporting the PSN of the MTC device 100 between the MME 510 and the SGSN 410 by transmitting a DDN refusal message to the S-GW 520.

According to a solution of a second disclosure of the present specification, if the MTC device 100 intends to enter the PSM state in a situation where the ISR is activated, the aforementioned problem is avoided by deactivating the ISR.

According to a solution of a third disclosure of the present specification, the S-GW 520 is allowed to recognize that the MTC device 100 is in the PSM state in a situation where the ISR is activated and the MTC device 100 is in the PSM state, and thus the S-GW 520 is not allowed to transmit a DDN to the MME 510 and the SGSN 410.

Hereinafter, disclosures of the present specification will be described in detail.

Figure 10A:
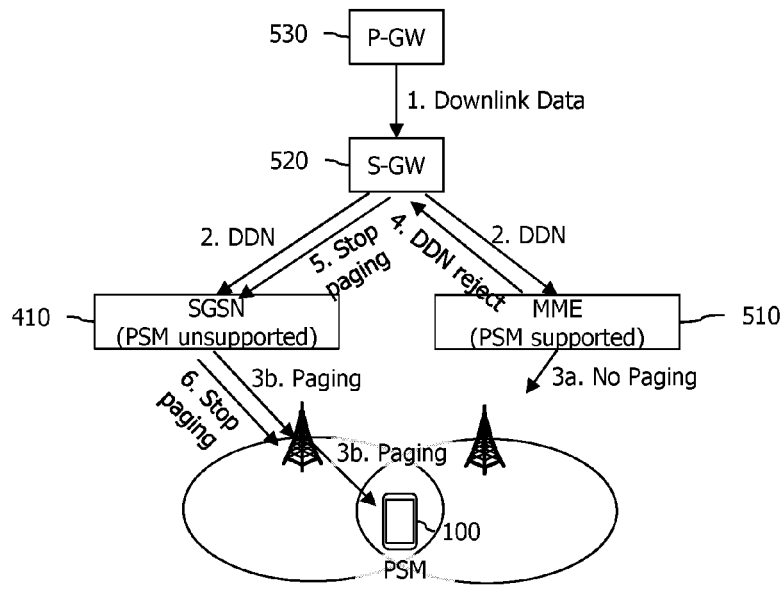
FIG. 10a briefly illustrates a solution according to a first disclosure of the present specification.
Figure 10B:
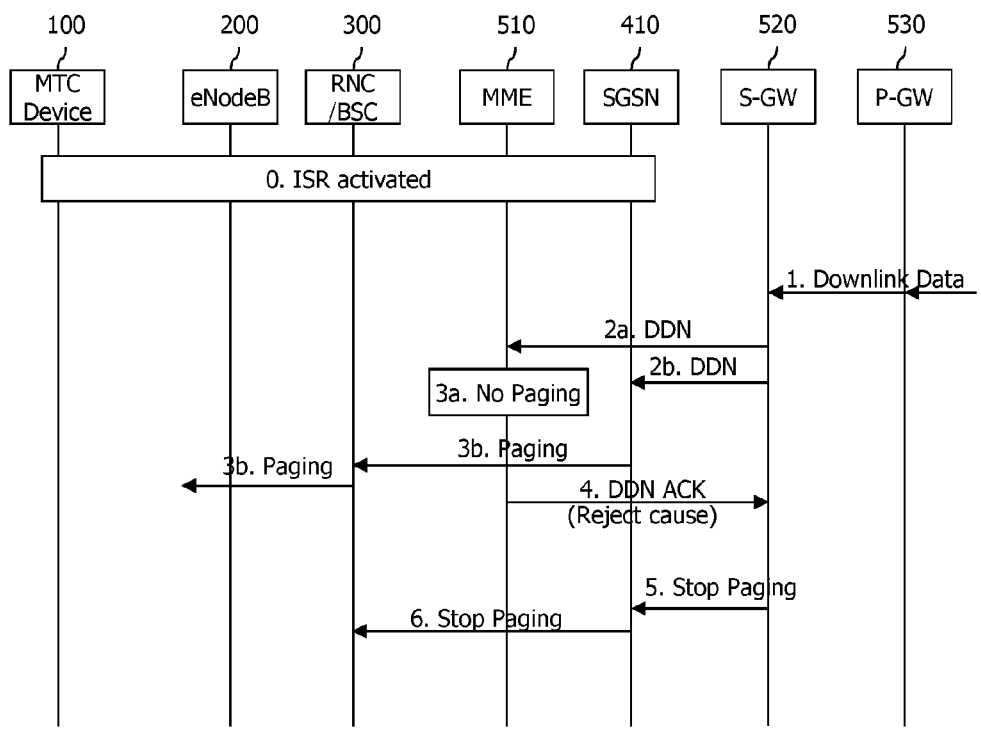
FIG. 10b is a signal flow specifically illustrating a solution according to the first disclosure of the present specification.

FIG. 10*a* briefly illustrates a solution according to a first disclosure of the present specification, and FIG. 10*b* is a signal flow specifically illustrating a solution according to the first disclosure of the present specification.

It is described hereinafter with reference to FIG. 10*a* and FIG. 10*b* together under the assumption that, although an ISR is activated and an MTC device 100 enters a PSM state, an MME 510 supports the PSM and thus knows that the MTC device 100 is in the PSM state, but an SGSN 410 does not support the PSM and thus does not know that the MTC device 100 is in the PSM state.

1) When a P-GW 530 receives downlink data to be transmitted the MTC device 100, it is transferred to an S-GW 520.

2) When the downlink data is transferred to the S-GW 520, a DDN is transmitted to the MME 510 and the SGSN 410.

3) In this case, the MME 510 knows that the MTC device 100 is in the PSM state and thus does not perform a paging procedure, whereas the SGSN 410 does not know that the MTC device 100 is in the PSM state and thus transmits a paging signal to an eNodeB so that it is transmitted to the MTC device 100.

4) The MME 510 transmits a message notifying of a DDN refusal to the S-GW 520 instead of transmitting the paging signal to the MTC device 100. The message notifying of the DDN refusal may be a DDN confirmation message including a refusal cause. The refusal cause may be, for example, "Unable to page UE" or "Unable to page UE due to Power Saving Mode (PSM)". Alternatively, the message notifying of the DDN refusal may be a DDN refusal message different from the DDN configuration message.

5) If the S-GW 520 receives the message notifying of the DDN refusal from any one of the MME 510 and the SGSN 410 in a situation where the ISR is activated, a paging stop request is transmitted to the other one. That is, in FIG. 10a and FIG. 10b, if the S-GW 520 receives the message notifying of the DDN refusal from the MME 510, the S-GW 520 transmits the paging stop request to the SGSN 410.

6) Then, according to the paging stop request, the SGSN 410 transmits the paging step request to the eNodeB.

Although it is illustrated in FIG. 10a and FIG. 10b that the MME 510 supports the PSM and the SGSN 410 does not support the PSM, the solution of the aforementioned first disclosure is also applicable to an opposite case (i.e., the MME 510 does not support the PSM but the SGSN 410 supports the PSM).

Figure 11A:
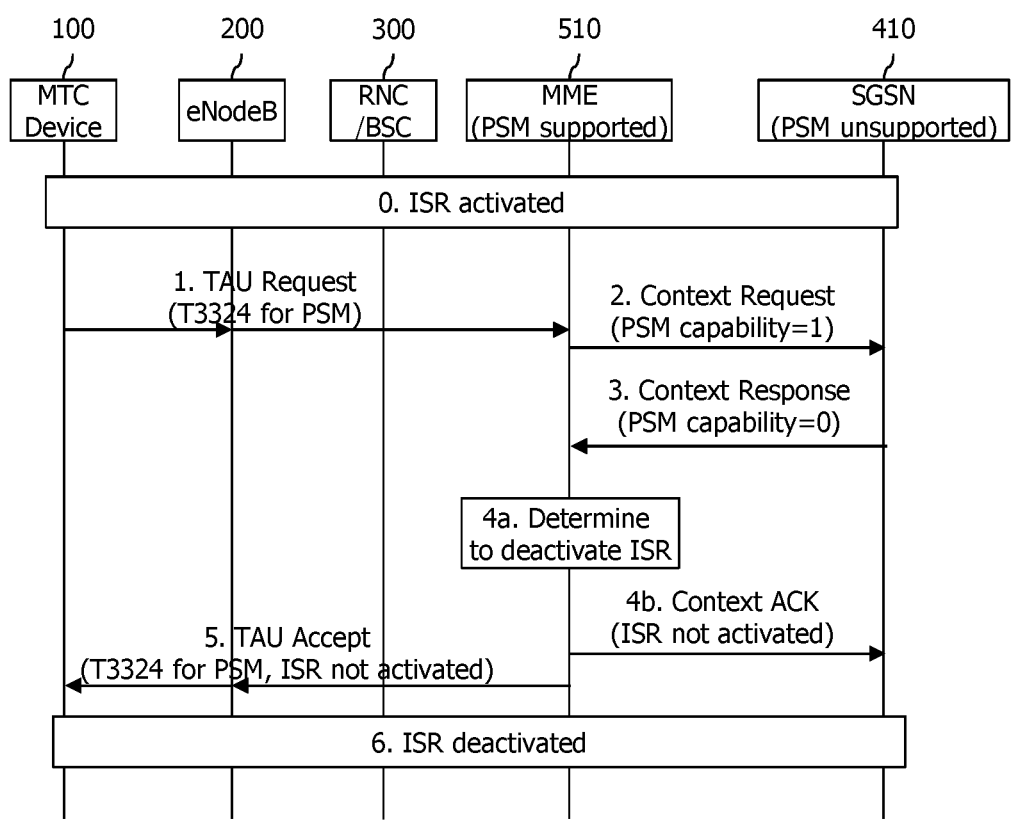
FIG. 11a is a signal flow briefly illustrating a TAU procedure to which a solution according to a second disclosure of the present specification is applied.
Figure 11B:
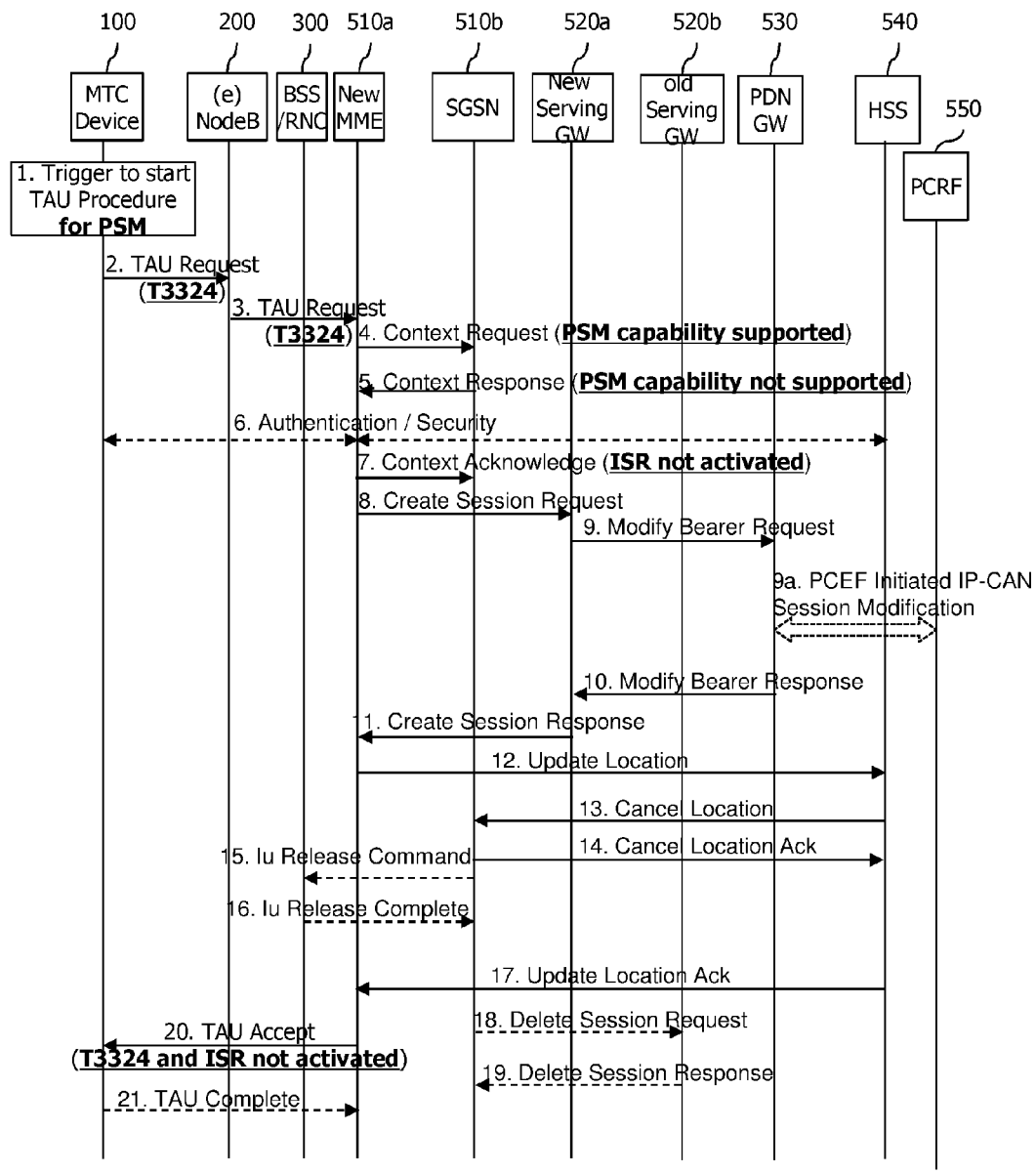

FIG. 11a is a signal flow briefly illustrating a TAU procedure to which a solution according to a second disclosure of the present specification is applied, and FIG. 11b is a signal flow specifically illustrating the TAU procedure of FIG. 11a.

As described above, according to the solution of the second disclosure of the present specification, if an MTC device 100 performs a TAU procedure to enter a PSM state in a situation where an ISR is activated, the aforementioned problem is avoided by deactivating the ISR. Hereinafter, FIG. 11a will be described with reference to FIG. 11b.

0) The ISR is activated, and the MME 510 supports the PSM whereas the SGSN 410 does not support the PSM.

1) If the MTC device 100 desires to operate in the PSM in a situation where the ISR is activated, a TAU request message is transmitted to the MME 510. In this case, an active time timer (e.g., a value of T3324) for the PSM is included in the TAU request message.

2) The MME 510 recognizes whether to apply the PSM according to whether the active time timer (e.g., the value of T3324) is included in the received TAU request message, and transmits information regarding PSM capability supportability by including the information into a context request message transmitted by the MME 510 to the SGSN 410. If the PSM is supported by the MME 510, the information regarding the PSM capability supportability and included in the context request message may be set to, for example, 1.

3) In response to the context request message, the SGSN 410 transmits the information regarding the PSM capability supportability to the MME 510 by including the information into a context response message. In this case, if the PSM is not supported by the SGSN 410, the information regarding the PSM capability supportability and included in the context response message may be set to, for example, 0. (Alternatively, the information regarding the PSM capability supportability may not be included in the context response message, and this case is regarded as the same as the case where the information regarding the PSM capability supportability is set to 0).

4) If the PSM is not supported by the SGSN 410 as a result of confirming the information regarding the PSM capability supportability and included in the context response message, the MME 510 determines to deactivate the ISR. Subsequently, the MME 510 allows a context confirmation message to be transmitted to the SGSN 410 to include an indication indicating "ISR not activated".

5) Subsequently, the MME 510 transmits a TAU accept message including an indication indicating "ISR not activated" to the MTC device 100. Further, an active time timer value is included in the TAU accept message. The active time timer value included in the TAU accept message is a value determined by the MME 510 on the basis of the active time timer value included in the received TAU request message.

6) Subsequently, the MME 510 and the SGSN 410 perform a procedure for deactivating the ISR.

Figure 12A:
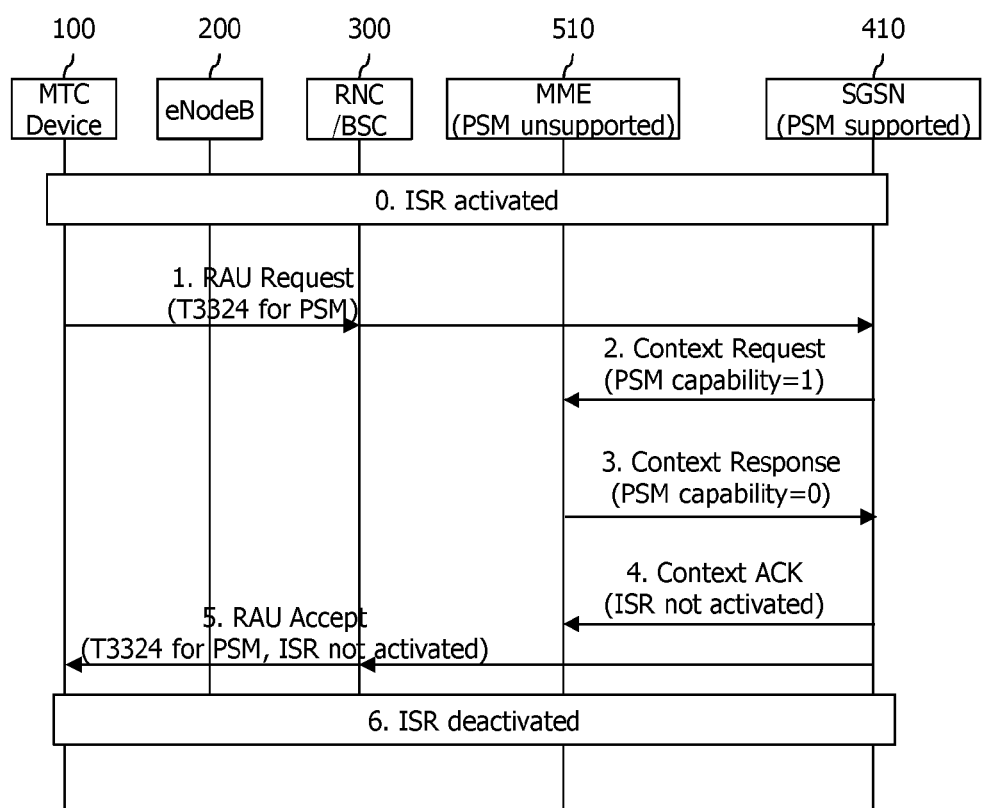
FIG. 12a is a signal flow briefly illustrating an RAU procedure to which a solution according to a second disclosure of the present specification is applied.
Figure 12B:
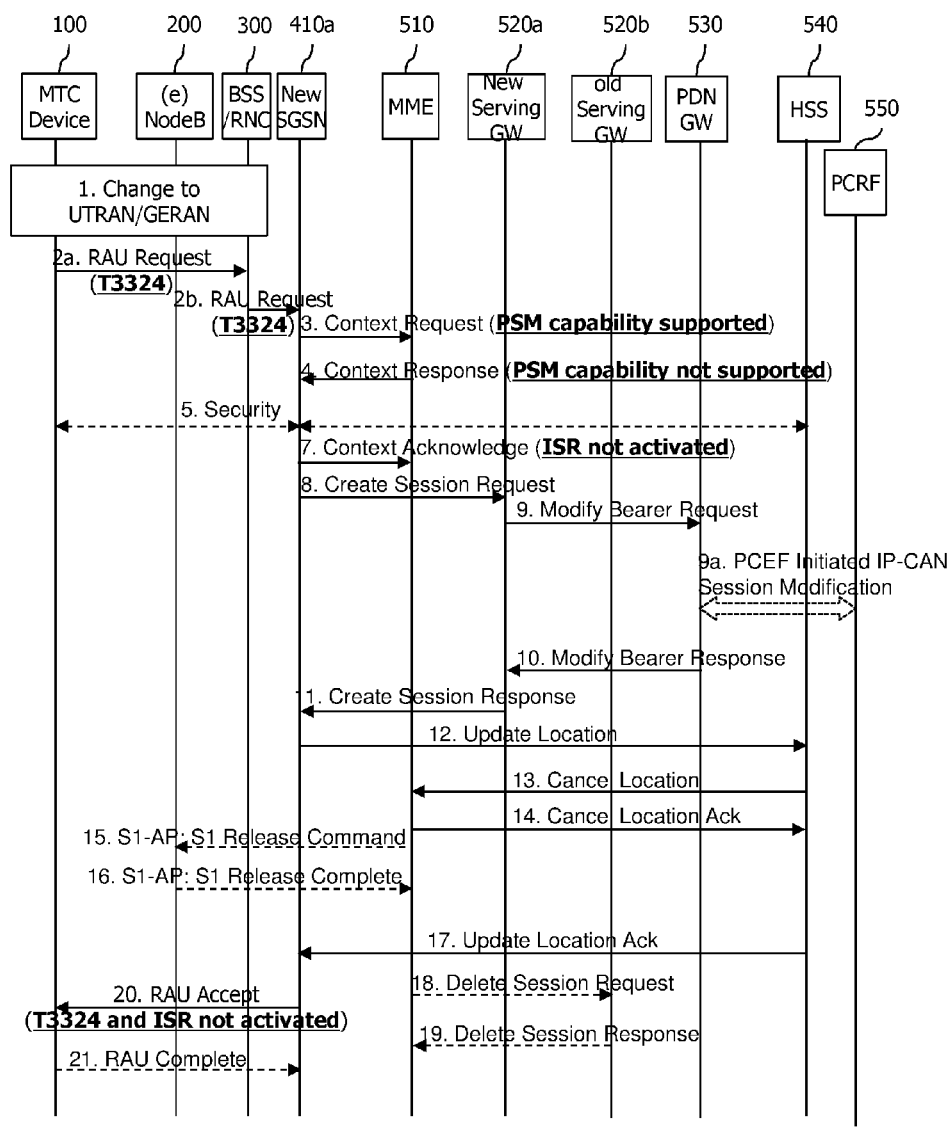

FIG. 12a is a signal flow briefly illustrating an RAU procedure to which a solution according to a second disclosure of the present specification is applied, and FIG. 12b is a signal flow specifically illustrating the RAU procedure of FIG. 12a.

It is shown in FIG. 12a and FIG. 12b that the solution of the second disclosure of the present specification is applied in an RAU procedure unlike in FIG. 11 and FIG. 11b described above. Since the RAU procedure is similarly to a TAU procedure, those ordinarily skilled in the art can fully understand the content of FIG. 12a and FIG. 1b can be known, and thus detailed descriptions thereof will be omitted.

Figure 13A:
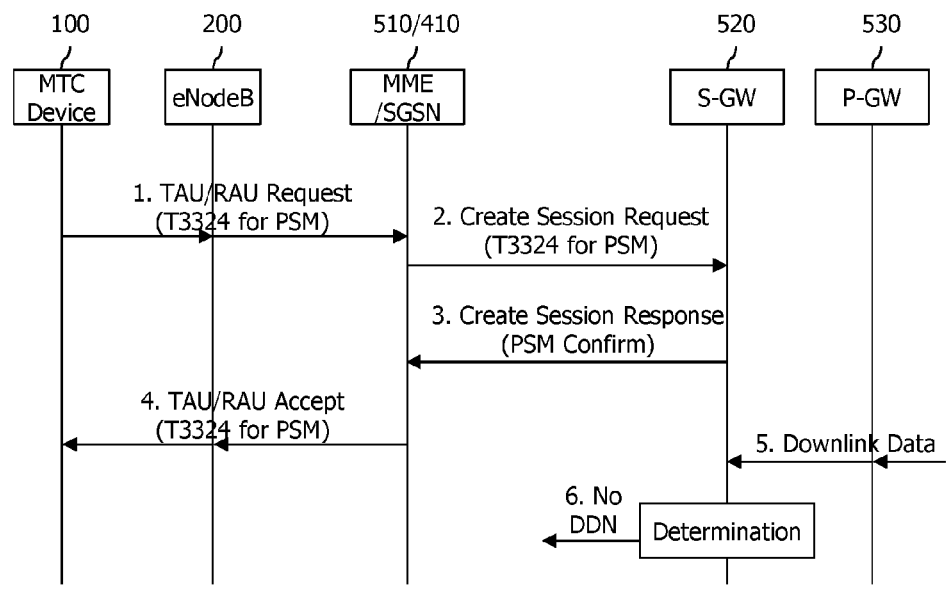
FIG. 13a and FIG. 13b are signal flows illustrating a solution according to a third disclosure of the present specification.
Figure 13B:
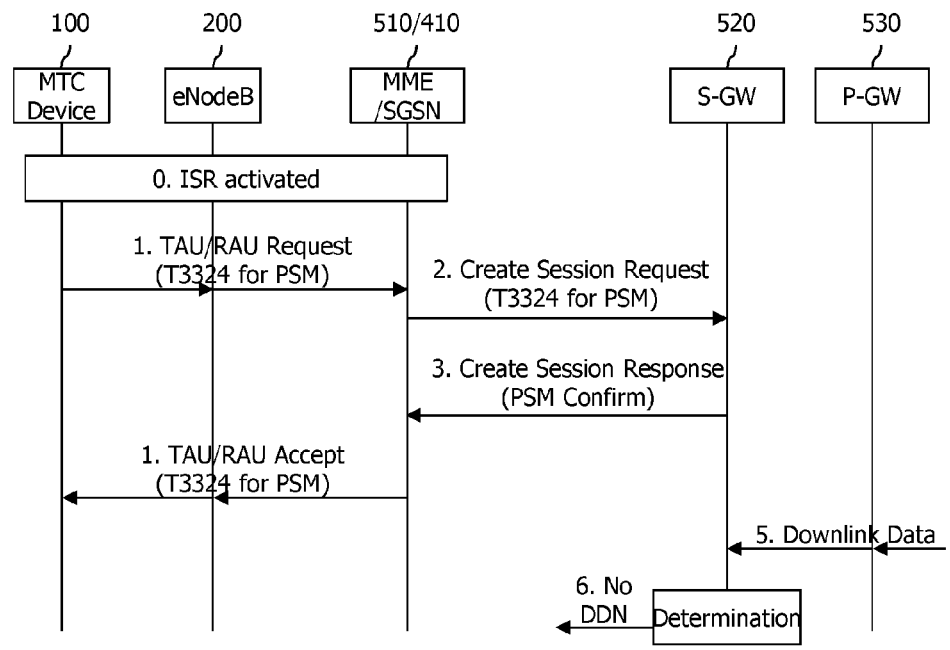

FIG. 13a and FIG. 13b are signal flows illustrating a solution according to a third disclosure of the present specification.

As described above, according to the solution of the third disclosure of the present specification, in a situation where an ISR is activated or deactivated and in a situation where an MTC device 100 is in a PSM state, an S-GW 520 is allowed to recognize that the MTC device 100 is in the PSM state, and thus the S-GW 520 is allowed not to transmit a DDN to the MME 510 and the SGSN 410.

First, it will be described with reference to FIG. 13a.

1) If the MTC device 100 desires to operate in a PSM, a TAU/RAU request message is transmitted to the MME 510/SGSN 410. In this case, an active time timer (e.g., a value of T3324) for the PSM is included in the TAU/RAU request message.

2) According to whether the active time timer (e.g., the value of T3324) is included in the received TAU/RAU request message, the MME 510/SGSN 410 recognizes whether to apply the PSM. Subsequently, an active time timer value (e.g., the value of the T3324) for the MTC device 100 is determined on the basis of the active time timer value (e.g., the value of T3324) included in the TAU/RAU request message. Further, the MME 510/SGSN 410 transmits a session creation request (e.g., Create Session Request) message including the determined active time timer value (e.g., the value of T3324) to the S-GW 520. Alternatively, the determined active time timer value (e.g., the value of T3324) may be transmitted to the S-GW 520 by being included in a different session message other than the session creation request message.

3) The S-GW 520 recognizes that the PSM is applied to the MTC device 100, and stores the value of the active time timer (e.g., T3324) of the MTC device 100. Further, the S-GW 520 transmits an indication for notifying a confirmation on the PSM (e.g., "PSM Confirm") by including it into a session creation response message (e.g., Create Session Response). Alternatively, the indication for notifying the confirmation on the PSN may be transmitted by being included in a different control message.

4) The MME 510/SGSN 410 transmits the determined active time timer value (e.g., the value of T3324) to the MTC device 100 by including the value into a TAU/RAU accept message.

5) Meanwhile, if the P-GW 530 receives downlink data for the MTC device 100, it is transferred to the S-GW 520.

6) Upon receiving the downlink data for the MTC device 100, the S-GW 520 determines whether the MTC device 100 is currently in the PSM state or in the active state on the basis of the active time timer of the MTC device 100.

If the MTC device 100 is in the PSM state, the S-GW 520 does not transmit a DDN to the MME 510/SGSN 410.

Meanwhile, referring to FIG. 13*b*, it is shown a situation in which the ISR is activated among the MTC device 100, the MME 510, and the SGSN 410. In such a situation, similarly to the above description of FIG. 13*a*, if the MTC device 100 is in the PSM state, the S-GW 520 does not transmit the DDN to the MME 510/SGSN 410.

The content described up to now can be implemented in hardware. This will be described with reference to FIG. 14.

Figure 14:
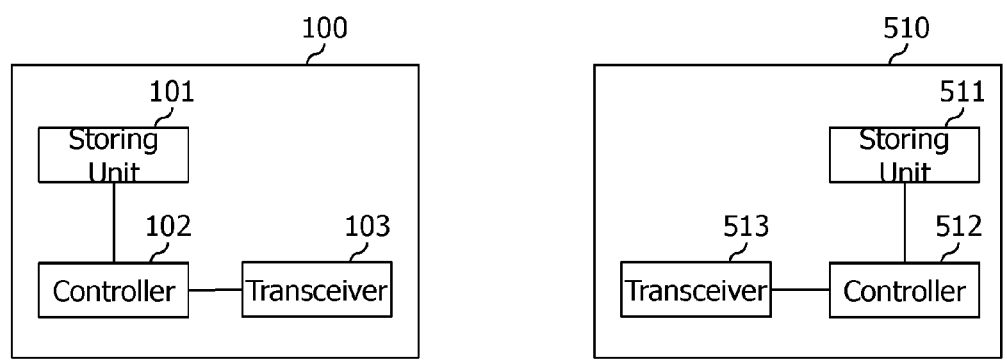
FIG. 14 is a block diagram of an MTC 100 and an MME 510 according to one disclosure of the present specification.

FIG. 14 is a block diagram of an MTC 100 and an MME 510 according to one disclosure of the present specification.

As shown in FIG. 15, the MTC 100 includes a storage unit 101, a controller 102, and a transceiver 103. Further, the MME 510 includes a storage unit 511, a controller 512, and a transceiver 513.

The storage units 101 and 511 store the aforementioned method.

The controllers 102 and 512 control the storage units 101 and 511 and the transceivers 103 and 513. More specifically, the controllers 102 and 512 respectively execute the methods stored in the storage units 101 and 511. Further, the controllers 102 and 512 transmit the aforementioned signals via the transceivers 103 and 513.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method of transferring downlink data, the method performed by a Serving Gateway (S-GW) and comprising:
    transmitting a Downlink Data Notification (DDN) message to a Mobility Management Entity (MME) and a Serving General Packet Radio Service (GPRS) Supporting Node (SGSN), when downlink data arrives at a wireless device in a state where an Idle mode Signaling Reduction (ISR) is activated;
    receiving a message indicating a refusal of the DDN from any one of the MME and SGSN when the wireless device cannot receive the downlink data since it is in a power saving mode (PSM); and
    transmitting a paging stop request message to any one of the MME and SGSN upon receiving the message indicating the refusal of the DDN,
    wherein when the message indicating the refusal of the DDN is received from the MME, the paging stop request message is transmitted to the SGSN, and when the message indicating the refusal of the DDN is received from the SGSN, the paging stop request message is transmitted to the MME.

2. The method of claim 1, wherein the message indicating the refusal of the DDN is a DDN confirmation message including a cause for the refusal or a message different from a DDN accept message.

3. The method of claim 1, wherein when the MME supports the PSM of the wireless device but the SGSN does not support the PSM of the wireless device, the message indicating the refusal of the DDN is received from the MME.

4. The method of claim 1, wherein when the MME does not support the PSM of the wireless device but the SGSN supports the PSM of the wireless device, the message indicating the refusal of the DDN is received from the SGSN.

5. A Serving Gateway (S-GW) comprising:
    a transceiver; and
    a controller that:
    controls the transceiver to transmit a Downlink Data Notification (DDN) message to a Mobility Management Entity (MME) and a Serving General Packet Radio Service (GPRS) Supporting Node (SGSN) when downlink data arrives at a wireless device in a state where an Idle mode Signaling Reduction (ISR) is activated,
    controls the transceiver to receive a message indicating a refusal of the DDN from any one of the MME and SGSN when the wireless device cannot receive the downlink data since it is in a power saving mode (PSM), and
    controls the transceiver to transmit a paging stop request message to any one of the MME and SGSN upon receiving the message indicating the refusal of the DDN,
    wherein when the message indicating the refusal of the DDN is received from the MME, the paging stop request message is transmitted to the SGSN, and when the message indicating the refusal of the DDN is received from the SGSN, the paging stop request message is transmitted to the MME.

\* \* \* \* \*